(12) United States Patent
Imazawa et al.

(10) Patent No.: US 10,848,028 B2
(45) Date of Patent: Nov. 24, 2020

(54) ROTOR OF ROTATING ELECTRIC MACHINE

(71) Applicant: Mitsubishi Electric Corporation, Tokyo (JP)

(72) Inventors: Yoshiro Imazawa, Tokyo (JP); Shintaro Shimizu, Tokyo (JP); Kenji Maekawa, Tokyo (JP); Yoshihiro Shinosaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/754,306

(22) PCT Filed: Nov. 6, 2015

(86) PCT No.: PCT/JP2015/081277
§ 371 (c)(1),
(2) Date: Feb. 22, 2018

(87) PCT Pub. No.: WO2017/077632
PCT Pub. Date: May 11, 2017

(65) Prior Publication Data
US 2018/0248436 A1   Aug. 30, 2018

(51) Int. Cl.
*H02K 3/52* (2006.01)
*H02K 3/32* (2006.01)
*H02K 1/24* (2006.01)

(52) U.S. Cl.
CPC ............. *H02K 3/325* (2013.01); *H02K 1/243* (2013.01); *H02K 3/528* (2013.01); *H02K 2203/12* (2013.01)

(58) Field of Classification Search
CPC .. H02K 1/00; H02K 1/22; H02K 1/24; H02K 1/243; H02K 3/00; H02K 3/32;
(Continued)

(56) References Cited

U.S. PATENT DOCUMENTS 5,886,451 A   3/1999 Hatsios et al.
5,898,252 A   4/1999 Tanaka et al.
(Continued)

FOREIGN PATENT DOCUMENTS

CN   2350920 Y   11/1999
EP   1027765 A1   8/2000
(Continued)

OTHER PUBLICATIONS

Communication dated Apr. 8, 2019 from the European Patent Office in application No. 15907818.7.
(Continued)

*Primary Examiner* — Tran N Nguyen
(74) *Attorney, Agent, or Firm* — Sughrue Mion, PLLC; Richard C. Turner

(57) ABSTRACT

A detachment prevention portion extending in a circumferential direction of a flange portion of a bobbin from a neck portion of a locking portion provided so as to extend radially outward from the flange portion is formed such that a length by which the detachment prevention portion extends to one side in the circumferential direction is longer than a length by which the detachment prevention portion extends to another side in the circumferential direction. Accordingly, interference between cover portions and a field coil winding or between the cover portions and a winding jig for the winding during operation of winding a lead wire of the winding can be inhibited while electric insulation between a field coil and claw-shaped magnetic poles is ensured.

10 Claims, 5 Drawing Sheets

(58) Field of Classification Search
CPC ............ H02K 3/325; H02K 3/34; H02K 3/46; H02K 3/51; H02K 3/52; H02K 3/528; H02K 13/02
See application file for complete search history.

(56) References Cited

U.S. PATENT DOCUMENTS

| | | | |
|---|---|---|---|
| 6,107,719 | A | 8/2000 | Asao |
| 6,172,434 | B1* | 1/2001 | Oohashi ................ H02K 3/528 310/194 |
| 7,608,973 | B2 | 10/2009 | Maeda et al. |
| 2005/0218744 | A1* | 10/2005 | Nakanishi ............... H02K 3/18 310/194 |
| 2007/0114879 | A1 | 5/2007 | Maeda et al. |
| 2011/0278974 | A1 | 11/2011 | Matsuyama et al. |
| 2013/0334918 | A1 | 12/2013 | Kimura et al. |
| 2014/0265710 | A1* | 9/2014 | Zook ...................... H02K 1/243 310/195 |

FOREIGN PATENT DOCUMENTS

| | | |
|---|---|---|
| JP | 61-196743 A | 8/1986 |
| JP | 62138041 A | 6/1987 |
| JP | 62135660 U | 8/1987 |
| JP | 2007-151211 A | 6/2007 |
| WO | 2004/038893 A1 | 5/2004 |
| WO | 2012/164611 A1 | 12/2012 |

OTHER PUBLICATIONS

International Search Report of PCT/JP2015/081277 dated Dec. 28, 2015.
Communication dated Jul. 9, 2019, from the European Patent Office in counterpart European Application No. 15 907 818.7.
Communication dated Nov. 19, 2019 from the European Patent Office in application No. 15907818.7.
Communication dated Feb. 6, 2020 from the State Intellectual Property Office of the P.R.C. in Application No. 201580084023.8.
Communication dated May 14, 2019 issued by the State Intellectual Property Office of People's Republic of China in counterpart application No. 201580084023.8.
Communication dated Apr. 15, 2020, from the European Patent Office in Application No. 15907818.7.
Communication dated Jun. 3, 2020, from the State Intellectual Property Office of the P.R.C in application No. 201580084023.8.

* cited by examiner

ROTOR OF ROTATING ELECTRIC MACHINE

CROSS REFERENCE TO RELATED APPLICATIONS

This application is a National Stage of International Application No. PCT/JP2015/081277 filed Nov. 6, 2015, which is incorporated by reference herewith.

TECHNICAL FIELD

The present invention relates to a rotor provided in a vehicular AC generator that is provided as a rotating electric machine in a vehicle or the like and that is driven by an engine of the vehicle to generate power, and particularly relates to a bobbin structure on which a field coil provided in a rotor is wound.

BACKGROUND ART

As a winding bobbin for a field coil winding used in a rotor of a conventional rotating electric machine, for example, a bobbin is shown in FIG. 7 of Patent Document 1 below. Specifically, a winding portion on which the field coil winding is wound is provided, flange portions are provided at both sides of the winding portion such that the winding portion is interposed therebetween, and a locking portion for locking the field coil winding is provided to each flange portion. Rotation prevention portions are formed at equal intervals in the circumferential direction of each flange portion, and cover portions are provided so as to extend radially outward between the rotation prevention portions. The cover portions are formed so as to be integrated with the bobbin and cover the field coil wound on the winding portion of the bobbin, thereby ensuring electric insulation between the field coil and claw magnetic poles.

CITATION LIST

Patent Document

Patent Document 1: International Publication No. WO2012/164611 (pages 11 and 12, FIG. 7)

SUMMARY OF THE INVENTION

Problems to be Solved by the Invention

The rotor of the conventional rotating electric machine is formed as described above, and the locking portion for locking the conductor wire wound on the bobbin is provided so as to extend radially from one of the rotation prevention portions formed on the flange portions, in order to form the field coil, as shown in FIG. 7 of the above Patent Document 1. The length in the circumferential direction (the length shown by b in FIG. 7) between the cover portions, which are formed at both sides, in the circumferential direction, of the rotation prevention portion on which the locking portion is provided is longer than the length in the circumferential direction (the length shown by c in FIG. 7) between the cover portions, which are formed at both sides, in the circumferential direction, of each of the rotation prevention portions on which the locking portion is not provided. Due to such a configuration, during operation of winding the conductor wire forming the field coil, interference between the cover portions and the conductor wire or between the cover portions and a conductor wire winding jig can be inhibited, but the size of a side surface of each cover portion may be reduced, that is, a partial deletion of the cover portion may be caused such that, for example, the cover portion cannot sufficiently cover the range where insulation from the claw-shaped magnetic poles is required, which may lead to a reduction in the output of or breakdown of the rotating electric machine in the worst case. Such a problem is easily caused especially in a configuration in which multiple cover portions are provided on a circumference and thus the length in the circumferential direction between the cover portions adjacent in the circumferential direction becomes narrow. This becomes a problem arising when the number of magnetic poles is increased or the size is reduced.

The present invention has been made to solve the above-described problem, and an object of the present invention is to obtain a rotor of a rotating electric machine that inhibits interference between cover portions and a field coil winding or between the cover portions and a winding jig for the winding during operation of winding a lead wire of the winding while ensuring electric insulation between a field coil and claw-shaped magnetic poles. Furthermore, an object of the present invention is also to achieve an increase in the number of magnetic poles and size reduction.

Solution to the Problems

A rotor of a rotating electric machine according to the present invention includes: a field core having claw-shaped magnetic poles and configured to rotate about a shaft integrally with the shaft; and a bobbin including a winding portion, fixed to the field core, for winding a field coil, flange portions provided at both sides, in an axial direction, of the winding portion, and a locking portion provided so as to extend radially outward from the flange portion and by which at least one end portion of the field coil is locked, and the locking portion includes a locking neck portion on which the field coil is wound, and a detachment prevention portion extending in a circumferential direction from the locking neck portion, and a length by which the detachment prevention portion extends from the locking neck portion to one side in the circumferential direction is longer than a length by which the detachment prevention portion extends from the locking neck portion to another side in the circumferential direction.

A rotor of a rotating electric machine according to the present invention includes: a field core having claw-shaped magnetic poles and configured to rotate about a shaft integrally with the shaft; and a bobbin including a winding portion, fixed to the field core, for winding a field coil, flange portions provided at both sides, in an axial direction, of the winding portion, a locking portion provided so as to extend radially outward from the flange portion and by which at least one end portion of the field coil is locked, and a plurality of rotation prevention portions provided on the flange portions in a circumferential direction so as to project in an axial direction, and the locking portion includes a locking neck portion on which the field coil is wound, and a detachment prevention portion extending in the circumferential direction from the locking neck portion, and a center, in the circumferential direction, of the locking neck portion is displaced to a rearward side of bobbin winding relative to a center, in the circumferential direction, of the rotation prevention portion.

Effect of the Invention

According to theses inventions, a detachment prevention effect can be achieved more than in the conventional art, and thus a rotor of a rotating electric machine that can improve workability of winding the field coil can be obtained.

DESCRIPTION OF EMBODIMENTS

Hereinafter, a preferred embodiment of a rotor of a rotating electric machine according to the present invention will be described with reference to the drawings.

Embodiment 1

Figure 1:
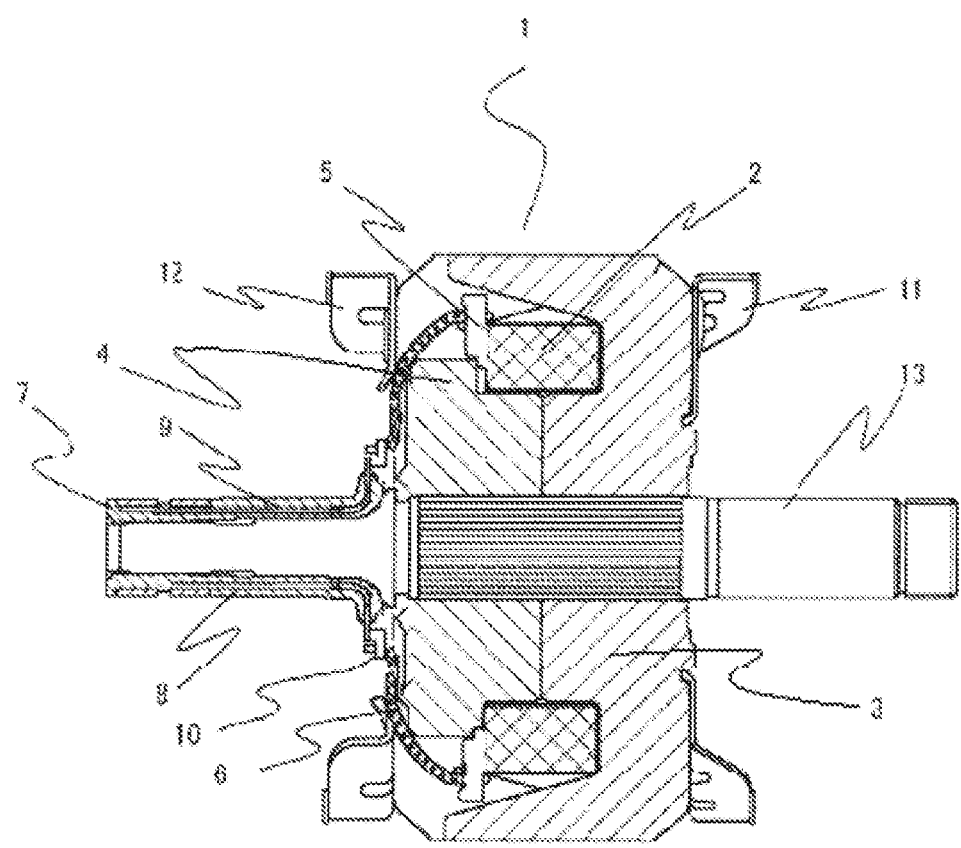
FIG. 1 is a cross-sectional view showing a rotor structure of a rotating electric machine according to Embodiment 1 of the present invention.
Figure 2:
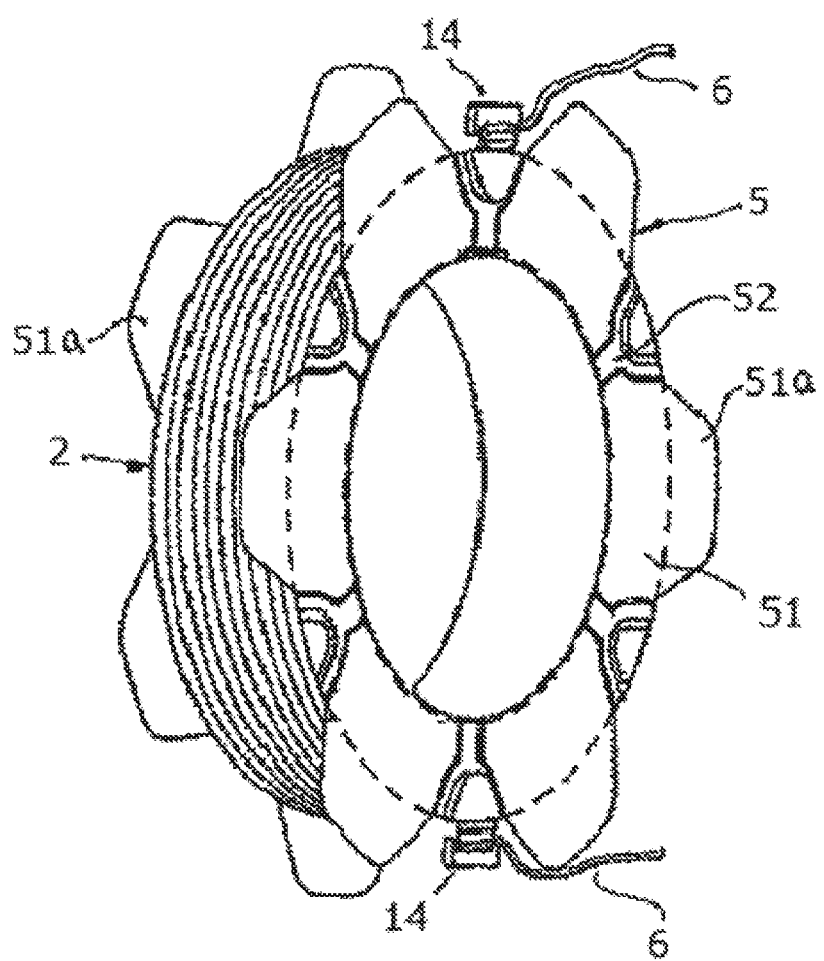
FIG. 2 is a perspective view showing an insulating bobbin of a rotor in FIG. 1 and a field coil wound on the insulating bobbin in Embodiment 1 of the present invention.
Figure 3:
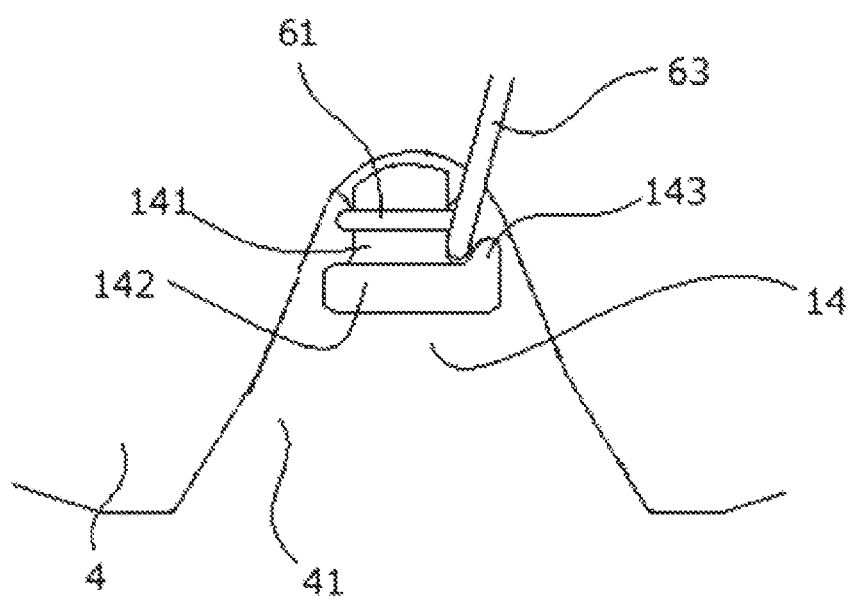
FIG. 3 is an enlarged view around a locking portion in FIG. 1 in Embodiment 1 of the present invention.

FIG. 1 is a cross-sectional view showing a rotor structure of a rotating electric machine according to Embodiment 1 of the present invention, FIG. 2 is a perspective view showing an insulating bobbin of a rotor in FIG. 1 and a field coil wound on the insulating bobbin, and FIG. 3 is an enlarged view around a locking portion in FIG. 1.

A rotor 1 of the rotating electric machine includes: an insulating bobbin 5; a field coil 2 that is obtained by winding a conductor wire on the insulating bobbin 5 over multiple layers and that generates a magnetic flux when a current is applied thereto; and a field core that is provided so as to cover the field coil 2. The field core includes a field core body 3 and a field core body 4, and the respective field core bodies 3 and 4 have claw-shaped magnetic poles (claw poles) that are set so as to alternately mesh with each other. In addition, a fan 11 is fixed to an end surface of the field core body 3, and a fan 12 is fixed to an end surface of the field core body 4.

The field coil 2 and the field core are fixed to a shaft 13, and the shaft 13 is rotatably supported at both end portions thereof by a front bearing (not shown) and a rear bearing (not shown). A pulley (not shown) is fixed to one end portion of the shaft 13, and a slip ring assembly 7 for supplying a current to the field coil 2 is provided on another end portion of the shaft 13. The slip ring assembly 7 is configured to supply a current from the outside to two slip rings via a brush that is not shown.

A lead wire 6 extended from the field coil 2 is locked by a locking portion 14 provided on a flange portion 51 (shown by a broken line) of the insulating bobbin 5, and then connected to the slip ring assembly 7. At this time, the lead wire 6 is taken out from a recess 41 (see FIG. 3) between the adjacent claw magnetic poles of the field core body 4, extends along the outer end surface of the field core body 4, and is connected via a lead wire connection portion 10 to terminals 8 and 9 forming the slip ring assembly 7. As described also in Patent Document 1, the lead wire 6 is tightened to the slip ring assembly 7 at predetermined tension such that the lead wire 6 is inhibited from moving radially outward due to centrifugal force. Rotation prevention portions 52 are formed in the circumferential direction of the flange portion 51, and cover portions 51a are provided so as to extend radially outward between the rotation prevention portions 52. The cover portions 51a are formed so as to be integrated with the insulating bobbin 5 and cover the field coil 2 wound on a winding portion of the insulating bobbin 5, thereby ensuring electric insulation between the field coil 2 and the claw magnetic poles.

Figure 4:
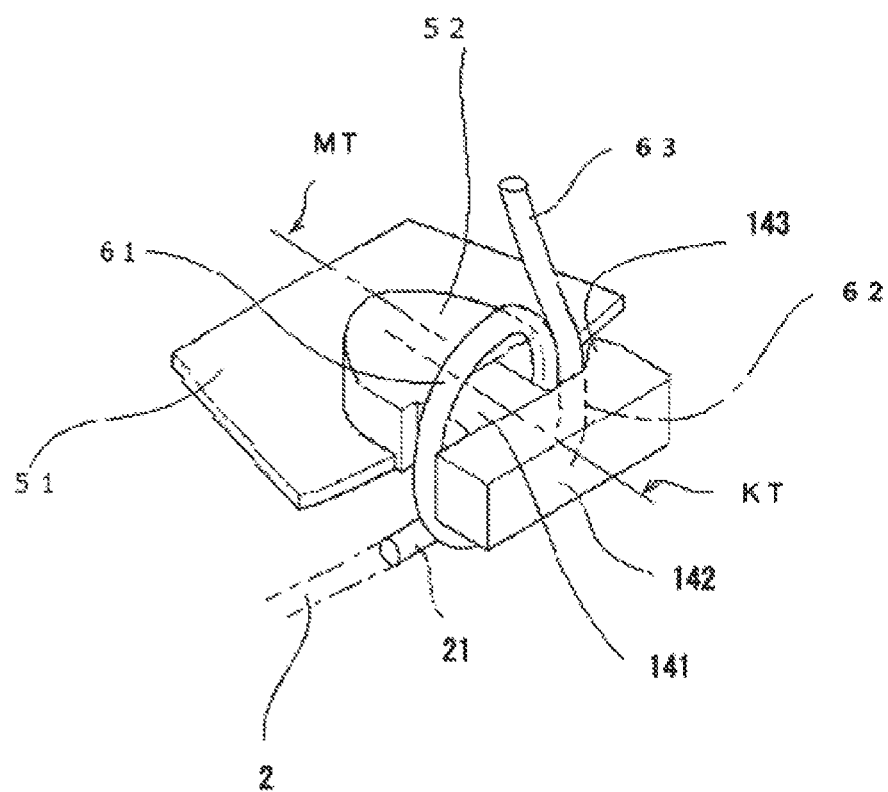
FIG. 4 is an explanatory perspective view showing a state where a lead wire is wound on the locking portion in FIG. 2 in Embodiment 1 of the present invention.

FIG. 4 is an explanatory perspective view showing a state where the lead wire is wound on the locking portion in FIG. 2.

Figure 5:
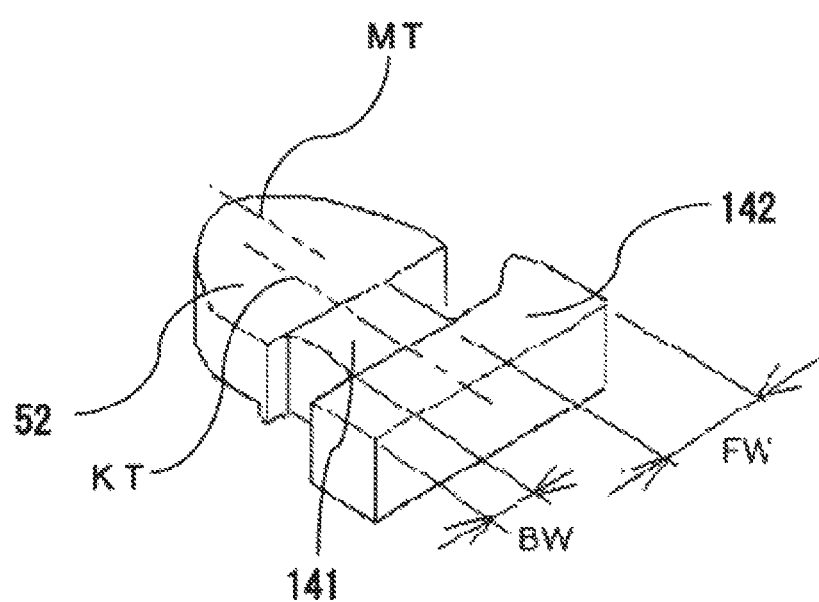
FIG. 5 is an enlarged view of a rotation prevention portion, a locking portion neck portion, and a locking portion detachment prevention portion in FIG. 4 in Embodiment 1 of the present invention.

The lead wire 6 includes a first circling portion 61 that is obtained by causing a terminal end 21 of the field coil 2 to circle around a locking portion neck portion 141 of the locking portion 14 after the field coil 2 is wound on the insulating bobbin 5, and a second circling portion 62 and a lead wire-slip ring connection portion 63 following the first circling portion 61. Radial movement of the first and second circling portions 61 and 62 is restricted by a locking portion detachment prevention portion 142 that is provided in the radial direction further from the locking portion neck portion 141 and that extends in the circumferential direction. As shown in FIGS. 4 and 5, the locking portion detachment prevention portion 142 is formed such that a length FW by which the locking portion detachment prevention portion 142 extends from the locking portion neck portion 141 in the circumferential direction at the side (the forward side of bobbin winding) at which the second circling portion 62 is overlapped at the radially outer side of the first circling portion 61 is longer than a length BW of the locking portion detachment prevention portion 142 at the side (the rearward side of bobbin winding) at which the second circling portion 62 is not overlapped (FW>BW). Accordingly, the first circling portion 61 and the second circling portion 62 are inhibited from being detached from the locking portion neck portion 141. In addition, at the side at which the second circling portion 62 is not overlapped (the rearward side of bobbin winding), the length BW by which the locking portion detachment prevention portion 142 extends from the locking portion neck portion 141 in the circumferential direction can be a minimum length, so that it becomes possible to handle a rotor in which the number of magnetic poles is increased. Furthermore, at the side (the forward side of bobbin winding) at which the second circling portion 62 is overlapped at the radially outer side of the first circling portion 61, a locking portion projection 143 is formed on the locking portion detachment prevention portion 142 so as to project radially inward, so that the first and second circling portions 61 and 62 are restricted from moving away from the locking portion neck portion 141.

Due to such a structure, the locking portion detachment prevention portion 142 can achieve a detachment prevention effect more than in the conventional art, and also can be provided at a sufficient interval from the adjacent cover portions 51a, since the length, in the circumferential direction, of the locking portion detachment prevention portion 142 can be minimized. Furthermore, the lead wire 6, which is wound on the locking portion neck portion 141 that is shorter in the circumferential direction than the locking portion detachment prevention portion 142, does not interfere with the cover portions 51a, and interference between a winding jig for the lead wire 6 and the cover portions 51a can be also avoided, during winding operation.

As shown in FIG. 4, in the case where each rotation prevention portion 52 similar to that in the conventional art is formed on the flange portion 51 at equal intervals along the circumferential direction so as to project along the axial direction, a center MT, in the circumferential direction, of the rotation prevention portion 52 is displaced relative to a center KT, in the circumferential direction, of the locking portion neck portion 141. That is, since the center, in the circumferential direction, of the locking portion neck portion 141 is shifted to the rearward side of winding, prevention of detachment of the lead wire 6 wound twice at the forward side of bobbin winding is ensured in a rotor having multiple magnetic poles and having a narrow distance between the magnetic poles.

Each rotation prevention portion 52 is basically provided in a substantially U shape, and the center MT thereof in the circumferential direction is provided in a shape along the center of the recess between the adjacent claw-shaped magnetic poles of the respective field core bodies 3 and 4. Thus, the center (KT), in the circumferential direction, of the locking portion neck portion 141 is displaced to the rearward side of winding relative to the center of the recess between the claw-shaped magnetic poles.

In the above embodiment, the number of the magnetic poles of the rotor is 12, and the diameter of the rotor is relatively large. However, the number of the magnetic poles may be 16 or greater, or the diameter may be smaller, and the number of the magnetic poles and the diameter are not limited thereto.

In the above embodiment, the locking portion 14 is provided at a position at which winding ends. However, the locking portion 14 may be provided in a similar shape at a position where winding starts. In this case, the length by which the locking portion detachment prevention portion extends in the circumferential direction may be set so as to be long at the side at which double winding is achieved, which side is not limited to the forward or rearward side of bobbin winding.

The embodiment may be modified or abbreviated as appropriate within the scope of the present invention.

DESCRIPTION OF THE REFERENCE CHARACTERS 1 rotor
2 field coil
3, 4 field core body
5 insulating bobbin
6 lead wire
7 slip ring assembly
8, 9 terminal
10 lead wire connection portion
11, 12 fan
13 shaft
14 locking portion
51 flange portion
51a cover portion
52 rotation prevention portion
141 locking portion neck portion
142 locking portion detachment prevention portion
143 locking portion projection

The invention claimed is:

1. A rotor of a rotating electric machine, comprising:
a field core having claw-shaped magnetic poles and configured to rotate about a shaft integrally with the shaft in a circumferential direction, the circumferential direction comprising a first circumferential direction and a second circumferential direction that is opposite from the first circumferential direction; and
a bobbin including a winding portion, fixed to the field core, for winding a field coil, flange portions provided at both sides, in an axial direction, of the winding portion, and a locking portion provided so as to extend radially outward from the flange portion and locking at least one end portion of the field coil, wherein
the locking portion includes a locking neck portion, the field coil being wound on the locking neck portion, and a detachment prevention portion extending from the locking neck portion in the first circumferential direction and the second circumferential direction, and a length of the detachment prevention portion extending from the locking neck portion in the first circumferential direction is longer than a length of the detachment prevention portion extending from the locking neck portion in the second circumferential direction, and a center of the locking neck portion is circumferentially displaced relative to a center of the rotation prevention portion.

2. The rotor of the rotating electric machine according to claim 1, wherein a projection is formed at the one side, in the first circumferential direction, of the detachment prevention portion so as to project radially inward.

3. The rotor of the rotating electric machine according to claim 1, wherein the first circumferential directional that the detachment prevention portion extends corresponds to a first side of bobbin winding, and
wherein the second circumferential directional that the detachment prevention portion extends corresponds to a second side of bobbin winding.

4. The rotor of the rotating electric machine according to claim 1, wherein a plurality of cover portions insulating the field coil and the field core from each other are formed on the flange portions in the first circumferential direction so as to extend from outer peripheral portions of the flange portions, and the locking portion is disposed between adjacent cover portions among the plurality of cover portions.

5. The rotor of the rotating electric machine according to claim 1, wherein the center of the locking neck portion is displaced in the first circumferential direction relative to a center of a recess between the claw magnetic poles.

6. The rotor of the rotating electric machine according to claim 1, wherein a plurality of rotation prevention portions are provided on the flange portions in the first circumferential direction.

7. A rotor of a rotating electric machine, comprising:
a field core having claw-shaped magnetic poles and configured to rotate about a shaft integrally with the shaft; and
a bobbin including a winding portion, fixed to the field core, for winding a field coil, flange portions provided at both sides, in an axial direction, of the winding portion, a locking portion provided so as to extend radially outward from the flange portion and locking at least one end portion of the field coil, and a plurality of rotation prevention portions provided on the flange portions in a circumferential direction comprising a first circumferential direction and a second circumferential direction that is opposite from the first circumferential direction so as to project in an axial direction, wherein
the locking portion includes a locking neck portion, the field coil being wound on the locking neck portion, and a detachment prevention portion extending from the locking neck portion in the first circumferential direction and the second circumferential direction, and a center of the locking neck portion is circumferentially displaced relative to a center of the rotation prevention portion.

8. The rotor of the rotating electric machine according to claim 7, wherein a projection is formed at the one side, in the first circumferential direction, of the detachment prevention portion so as to project radially inward.

9. The rotor of the rotating electric machine according to claim 7, wherein the one side of the detachment prevention portion extends in the first circumferential direction toward a first side of bobbin winding.

10. The rotor of the rotating electric machine according to claim 7, wherein a plurality of cover portions insulating the field coil and the field core from each other are formed on the flange portions of the bobbin in the circumferential direction so as to extend from outer peripheral portions of the flange portions, and the locking portion is disposed between adjacent cover portions among the plurality of cover portions.

* * * * *